Sept. 5, 1961 W. MOORTGAT-PICK 2,999,210

AUTOMATIC VOLUME EXPANDER

Filed Oct. 17, 1957 2 Sheets-Sheet 1

Inventor:
Waldemar Moortgat-Pick
By [signature]
Patent Agent

Sept. 5, 1961 W. MOORTGAT-PICK 2,999,210

AUTOMATIC VOLUME EXPANDER

Filed Oct. 17, 1957 2 Sheets-Sheet 2

Inventor:
Waldemar Moortgat-Pick
By [signature]
Patent Agent 2,999,210

AUTOMATIC VOLUME EXPANDER

Waldemar Moortgat-Pick, Grassau, Chiemgau, Germany, assignor to Korting Radio Werke G.m.b.H., Grassau, Chiemgau, Germany Filed Oct. 17, 1957, Ser. No. 690,714
Claims priority, application Germany Nov. 30, 1956
9 Claims. (Cl. 330—145)

The present invention relates to circuit arrangements to expand the volume range of audio-frequency amplifiers, said arrangements having as advantages low manufacturing costs and easy handling.

In the transmission of broadcasts, it is not possible to reproduce the presentations, particularly of orchestras at full volume, because an inferior signal-to-noise ratio would be present during pianissimo passages, and overmodulation and overloading of the transmitter during fortissimo passages. Therefore, the volume has to be compressed in the transmitter, the volume range usable in case of AM transmission being, at optimum, less than 10 db, and amounting from 10 db to 20 db between fortissimo and pianissimo in case of ultra-short wave transmission. As a result of this, the reproduction after transmission lacks liveliness and is distorted to a great extent.

In modern records, a greater dynamic volume range can be retained than in case of radio broadcast transmission, although it is also necessary in modern recording to considerably compress the volume range.

Circuits have been known which permit the expansion of the previously compressed volume range to a certain extent at the reproducing apparatus, i.e., in the audio frequency amplifier of the receiver or of the record playing apparatus. The known systems frequently comprise a circuit associated with a bridge circuit inserted before the loudspeaker and responding as a function of the volume and, hence, the output power, said bridge circuit comprising incandescent lamps with carbon or tungsten filaments. In addition, these known systems were rather expensive and difficult to handle. Consequently, such systems were applied only to special amplifiers rather than used in domestic radio receivers or amplifiers for record players.

The basic principle of these known circuits is that the audio frequency amplifier is equipped with a tube which has a controllable gain characteristic and, in no-signal condition, is biased downwardly, thus operating with a relatively low gain. A control potential dependent upon the signal level is then generated by a second audio frequency amplifier including a rectifier, whereby this control potential becomes increasingly positive with increasing signal level. This control potential is fed to the controllable gain tube of the audio frequency amplifier and causes the over-all gain to increase with increasing signal level, whereby the dynamic volume range of the reproduction is expanded and restored.

However, at the same time the D.C. voltage impulses comprising said control potential and produced during said control function are unavoidably fed from the anode of the controlled tube to the subsequent amplifier stages, disturbing the operation of the system and introducing distortions. A push-pull circuit including two controlled tubes has been recommended as a remedy for the disadvantages mentioned in the foregoing, whereby the D.C. impulses on the controlled tubes are cancelled out. Thus, no D.C. voltage impulses occur at the audio output and the control circuit time constants can be decreased. The cost of such a system is high, however.

It is an object of the present invention to avoid these disadvantages of the known circuits and to realize volume expansion without using a push-pull controlled circuit arrangement.

It is another object of the invention to insert a voltage divider for the audio frequency voltage between two tubes of the amplifier, wherein the shunted circuit impedances comprise in series one tube, the internal resistance of which is controlled by the control potential, and a condenser, the capacity of which is chosen so that D.C. voltage impulses at audio frequency sequence occurring during the control of said tube are eliminated by this condenser and, thus, cannot be received in the successive stages of the audio frequency amplifier.

If expansion of the volume range is desired, the control potential must become negative because then, the internal resistance of the shunted tube is increased with higher signal level, whereby the A.C. voltage across this tube becomes higher.

It is a further object of the invention to provide a circuit arrangement permitting various other advantages. Thus, the controlled shunted tube may constitute the triode section of a tuning indicator tube (electric eye), the indicator section of which serves to indicate the volume level. The control action affecting the volume range can be varied by means of push-buttons acting, for example, to vary the magnitude of the audio frequency voltage from which the control potential determining the dynamic volume range is derived.

The capacity of the condenser in series with the controlled tube should be selected in such a manner that the volume expansion is smaller at low audio frequencies than at medium audio frequencies, because overmodulation would first occur at lower frequencies, due to the large amplitudes thereof. If the purely resistive portion of the voltage divider is shunted by a condenser, the volume expansion action at high audio frequencies can be decreased as compared with that at medium audio frequencies.

The audio frequency voltage from which the control potential for controlling the volume range is to be derived may, preferably, be taken from the anode of the amplifier tube preceding the shunted voltage divider, because in case of expansion by means of increasing the gain of subsequent stages, the greatest amplitude of audio frequencies prior to expansion lies at this point.

When the control potential of the volume expansion circuit is disconnected, the amplification of the audio frequency amplifier is considerably decreased by the internal resistance of the shunted tube which is then very low, so that there exists the danger of overloading the tube in front of the shunted voltage divider, if the sound level is set at a high value.

It is an additional object of the invention to avoid this difficulty by increasing the impedance of the voltage divider at the instant when the said control potential is disconnected, i.e., by then adding a resistance to the existing shunt impedance. This resistance may be designed to advantage as potentiometer, as will be explained later on.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
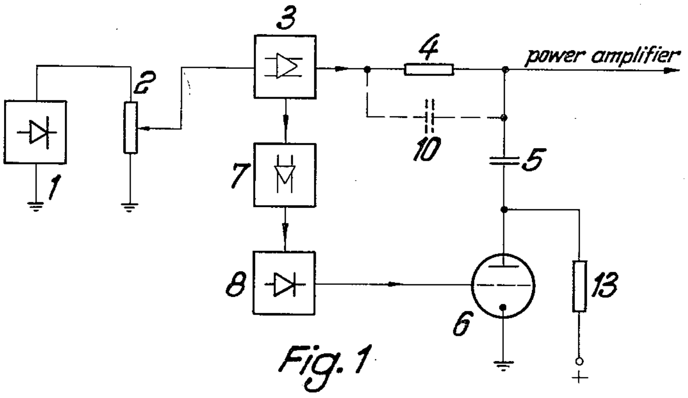
FIGURE 1 illustrates schematically by means of a block diagram a circuit arranged according to the invention.

In the block diagram of FIGURE 1, the audio frequency voltage supplied, for example, from a detector 1 of a radio set is fed to an audio frequency amplifier tube 3 via a volume control 2. The output of this tube 3 is connected to a voltage divider having a fixed series resistance 4 and a shunt impedance comprising a tube 6 having a controllable internal impedance and a series connected condenser 5. The audio frequency voltage fed to the succeeding stages of the amplifier is taken off across the shunt impedances 5, 6. An audio frequency voltage for an amplifier 7, supplying the control potential for volume range expansion, is taken from the audio frequency amplifier 3. The amplifier 7 is connected to a rectifier 8, from which said D.C. control potential is fed to the controlled shunt tube 6.

While the resistance 4 has, for example, a value of 200K ohms, the minimum value of the internal resistance of the shunted tube 6 is about 20K ohms. In case of a highly negative control potential, the maximum value of such internal resistance at cut-off of this tube 6 is infinite. Therefore, the maximum value of the shunt circuit of the tube 6 and its anode circuit resistance 13 equals the resistance value of the resistor 13 which may be, for example, 300K ohms.

The condenser 5 has the important purpose of blocking the D.C. voltage pulses occurring during operation of the control circuit and, thereby, preventing them from passing. The effect of the condenser 5 will readily be understood if the impedance tube 6 is considered as a D.C. generator whose load is constituted by the series circuit incorporating the circuit elements 3, 4 and 5. If the capacitance of condenser 5 is small, then the predominant portion of the D.C. impulses appears across the condenser 5 and only a small portion appears across the circuit elements 3 and 4. Only this small and insignificant portion reaches the power amplifier because the circuit elements 3 and 4, as seen from the generator, form a shunt of the voltage divider. The time constant of the series circuit comprising the condenser 5, the series resistance 4 of the voltage divider and the shunted circuit of the resistance 13 and the internal impedance of the controlled tube 6 are of essential importance in selecting the capacity values of the condenser 5. A certain maximum value for the time constant cannot be exceeded if the desired control action is to take place. Therefore, this condenser should be designed in such a manner, that the action of the dynamic expansion reduces at the low frequencies with decreasing frequency, because the impedance of the condenser in the low frequency range is higher than the lowest value of the internal resistance of the controlled tube 6. Thus, the control of the internal resistance of the tube 6, at low frequencies, will have virtually no effect on the output voltage. As a result of this, the loudspeaker or the final amplifier is protected against excessive amplitudes in the dynamic peaks, such amplitudes mostly occurring at low frequencies. Thereby, the subjective impression of the dynamic range expansion is intensified rather than diminished, because this expansion is designed to be larger at frequencies above the lower register.

It is possible to decrease the range expansion by shunting a condenser 10, suitably selected, for example, with a value of 500 micro-microfarads across the series resistance 4 of the voltage divider, whereby similar advantages are obtained as mentioned above without impairing the subjective impression of the dynamic range expansion.

Finally, the condenser 5 connected in series with the controlled tube 6 and the condenser 10 shunted across the series resistance 4 of the voltage divider can be so designed that, in addition to the automatic volume expansion, the manually actuated volume control will also operate substantially correctly from a subjective point of view, when the volume expansion potential is disconnected, because the medium frequencies are transmitted preferentially with increasing signal level in accordance with the frequency and amplitude response characteristics of the human ear. In this case, a separate arrangement to set the signal level to the proper hearing volume can be omitted.

Summarizing, the system according to the present invention serves to provide, with suitably selected magnitudes of all of the frequency dependent impedances, a desired frequency response curve for a modern audio frequency amplifier without disadvantages resulting from the action of the volume expansion means. In contrast to this, the known circuit arrangements for volume expansion had the mentioned disadvantages.

Figure 2:
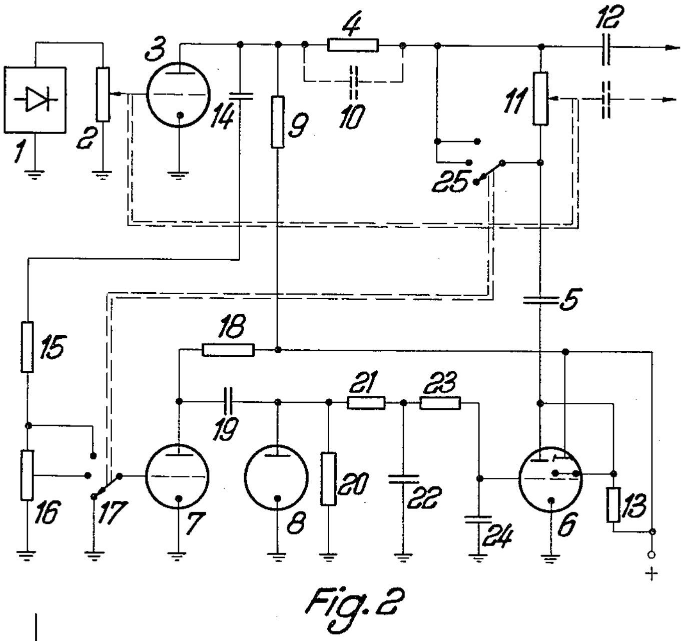
FIGURE 2 shows such a circuit including details omitted in the block diagram of FIGURE 1.

According to the more detailed circuit diagram of FIGURE 2, an audio frequency voltage is fed via the volume control 2 to the audio frequency tube 3, having a load resistance 9. The voltage divider 4, 5, 6', is connected to the anode of the tube 3. In addition to the series resistance 4 and the shunted impedance comprising the condenser 5 and the controlled tube 6' having an anode circuit resistance 13, there is inserted in the shunted circuit branch a resistance 11 adapted to be short-circuited and, thereby, rendered ineffective by means of a switch 25, when the dynamic range expansion potential is connected. This resistance 11 serves to cause a higher amplitude of audio frequency voltage to be supplied to the succeeding amplifier stages when the dynamic range control potential is disconnected to avoid overloading of the tube 3.

A condenser 10 for compression of the volume range at high frequencies is shunted across the series resistance 4. The audio frequency voltage is conducted to the next stage via a condenser 12.

The audio frequency voltage passes from the anode of the tube 3 to the amplifier tube 7 via a condenser 14, a voltage divider 15, 16 and push-button switch 17, said tube 7 having a load resistance 18. The audio frequency voltage is then supplied to a rectifier 8 via a condenser 19, said rectifier having a load resistance 20. The D.C. voltage formed is fed as a negative control potential to the grid of the controlled tube 6' via a filter network 21, 22, 23, 24. The controlled tube constitutes the triode section of a tuning indicator tube adapted here to indicate the volume expansion range rather than tuning. The control potential for the range control fed to the controlled tube has the proper polarity for such indication.

In certain instances, the mentioned fixed resistance 11 may suitably be replaced by a potentiometer, from the wiper arm of which the audio frequency voltage for the next stage is tapped, as indicated by dash-dash lines in FIGURE 2. If the fixed resistance 11 is relatively high, the volume level of the reproduction is initially decreased when the volume expansion control potential is connected and, simultaneously, the resistance 11 is short-circuited. This is undesirable from the subjective point of view in evaluating the action of the dynamic range expansion. This disadvantage can be avoided by inserting a potentiometer in place of the fixed resistance 11, said potentiometer being mechanically coupled with volume control. As a result of this arrangement, the otherwise undesirable volume level reduction takes place only if the control member 2 is set to a high volume level and the potentiometer is thus similarly adjusted in such a manner that the wiper arm is in the upper position. Thus, at lower and medium volume levels, adjustable by means of the control member 2, no over-all reduction in volume level occurs when the dynamic range expansion is connected and the potentiometer 11 is simultaneously short-circuited, because the action of the lower portion of the potentiometer on the increase of the shunt impedance is still smaller, especially where the potentiometer has a logarithmic characteristic.

Figure 3:
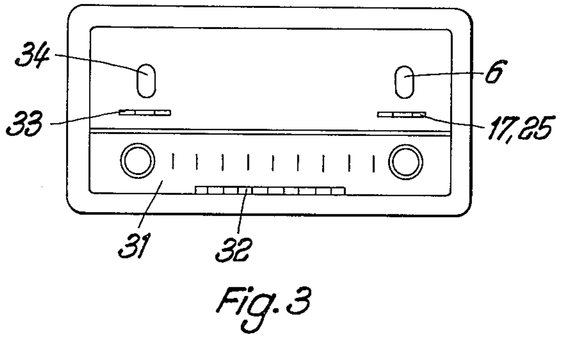
FIGURES 3 is a front view of the panel of an amplifier or radio set, showing push-buttons for selecting the amount of expansion of the volume range and showing a tuning indicator tube of the type mentioned.
Figure 4:
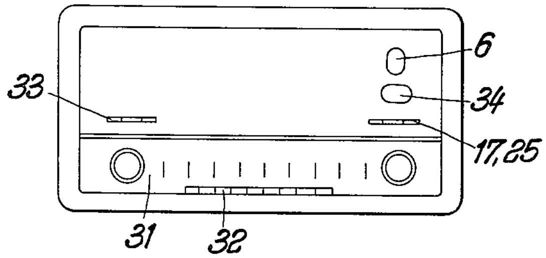
FIGURE 4 is a front view of a panel similar to that shown in FIGURE 3, but showing another embodiment of the invention.

In FIGURES 3 and 4, 31 denotes a dial on the panel of a radio set, 32 a push-button station selector, 33 a push-button selector for tone control, 34 a tuning indicator tube, 17, 25 a push-button control unit for selecting the volume expansion range, and 6' a degree-of-volume expansion indicator tube. The two latter members are the same as those shown in FIGURES 1 and 2.

Figure 5:
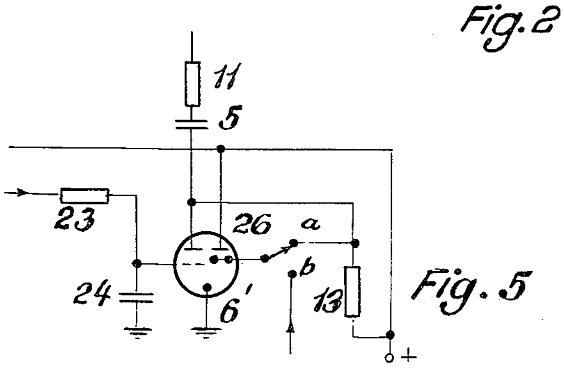
FIGURE 5 illustrates schematically a diagram of a circuit employing a tuning indicator tube indicating the volume range, said tube being adapted to indicate also the tuning of a radio set associated with the amplifier.

In the modified diagram of FIGURE 5, there is shown a part of the circuit of FIGURE 2 in modified form for selectively switching-over the connection of the deflection plate of the tuning indicator tube 6' from the anode of the triode section of this tube 6' (position *a*) to the screen-grid of an automatically controlled radio-frequency amplifier tube (not shown) (position *b*) by means of an additional switch 26. Thus, in position *a* of the switch 26, the indicator part of the tube 6' is used to indicate the degree-of-volume expansion and in position *b*, the tuning of the radio set. Therefore, in this embodiment, tuning of the receiver according to the tuning indication is possible without disconnecting the volume expansion range control. The same reference characters are used for like components as in FIGURE 2.

I claim:

1. An automatic volume range expander circuit for use with a multiple stage audio amplifier, comprising a potential developing means connected to a first stage of said amplifier and delivering unidirectional control potential impulses proportioned to the audio frequency amplitude in said first stage; and a voltage dividing circuit shunted across the output of said first stage and including an impedance connected in series to the input to the next stage, said voltage dividing shunt circuit comprising a condenser and a vacuum tube connected mutually in series from said input to ground, the internal resistance of said vacuum tube being controlled by the application of said control potential impulses to an electrode of the tube, and the capacity of said condenser as compared with the said impedance at the output of said first stage being chosen small enough that said unidirectional potential impulses occurring at audio frequencies will be blocked from entering the input to said next stage through said condenser and also small enough that the volume expansion at medium audio frequencies materially exceeds the volume expansion occurring at low audio frequencies.

2. In a circuit as set forth in claim 1, an electric eye indicating tube including an indicating section and a triode section, said triode section being connected as said controlled tube and said indicating section being connected thereto to indicate the instantaneous degree of volume expansion.

3. In a circuit as set forth in claim 1, said potential developing means including potential divider means adapted to furnish a plurality of potentials bearing different ratio relations to the amplitude of the audio frequency in said first stage, and switch means for selectively adjusting said control impulses according to one of said ratios.

4. In a circuit as set forth in claim 3, said potential developing means having an input connected to the output voltage of said first stage, and said potential divider and switch means being interposed between said input and said output to vary the proportion of said output voltage impressed across said input.

5. In a circuit as set forth in claim 1, said impedance inserted between the output of said first stage and the input to said next stage including the associated end of said voltage dividing circuit, said impedance including a resistance and a capacitor connected across said resistance and having a reactance of such magnitude, as compared with the value of said resistance, that at high audio frequencies the degree of volume expansion will be less than medium audio frequencies.

6. In a circuit as set forth in claim 1, a volume level adjusting resistor connected at one end in series with said voltage dividing shunt circuit and at its other end both to the output of said first stage and the input of said next stage, short-circuiting means connected across said level adjusting resistor; and means for disconnecting from said tube electrode said potential impulses, said latter means being interconnected with said short-circuiting means so as to short-circuit said resistor when said impulses are disconnected.

7. In a circuit as set forth in claim 6, a manual volume control in said amplifier ahead of said first stage, and said level adjusting resistor comprising a potentiometer connected at one end to the output of said first stage and at the other end to said shunt dividing circuit and having a wiper arm connected to the input of said next stage, and said volume control and said potentiometer being connected together for unitary rotation in the same volume-increasing and volume-decreasing directions.

8. In a circuit as set forth in claim 1, an electric eye indicating tube including an indicating section having a deflection electrode; and said amplifier including a radio set having a R.F. amplifier tube; and switch means connected with said deflection electrode and connected with said R.F. tube and said control tube in the shunt circuit for selectively connecting said indicating tube to show tuning of the radio set in one position of the switch and to show the degree of volume expansion in the other position of the switch.

9. In a circuit as set forth in claim 8, said R.F. amplifier tube having a screen grid, and said control tube having an anode, and the switch connections being to said screen grid and to said anode respectively.

References Cited in the file of this patent

UNITED STATES PATENTS

| | | |
|---|---|---|
| 2,256,071 | Bruck | Sept. 16, 1941 |
| 2,259,860 | Rinia | Oct. 21, 1941 |
| 2,276,708 | Wyckoff | Mar. 17, 1942 |
| 2,325,512 | Hepp | July 27, 1943 |
| 2,432,678 | Frederick | Dec. 16, 1947 |
| 2,576,145 | Rudkin | Nov. 27, 1951 |
| 2,805,338 | Siebenberg | Sept. 3, 1957 |
| 2,902,548 | Moeller | Sept. 1, 1959 |

FOREIGN PATENTS

| | | |
|---|---|---|
| 539,859 | Great Britain | Sept. 26, 1941 |
| 720,124 | Germany | Apr. 24, 1942 |